United States Patent
Vallee

[15] 3,641,917
[45] Feb. 15, 1972

[54] APPARATUS FOR THE STERILIZATION OF FOOD PRODUCTS

[72] Inventor: Felix Alexandre Jules Vallee, 7 rue Marcel Renault, Paris, 17eme, France

[22] Filed: Mar. 20, 1967

[21] Appl. No.: 624,607

[30] Foreign Application Priority Data

Mar. 28, 1966 France.....................................55151
Mar. 9, 1967 Germany.....................P 16 92 224.0

[52] U.S. Cl..................................99/251, 99/182, 99/189, 99/216, 99/272
[51] Int. Cl......................................A23l 3/100, C12h 1/100
[58] Field of Search..................99/171, 172, 182, 249, 183, 99/251, 214, 165, 211; 53/112; 21/57

[56] References Cited

UNITED STATES PATENTS

| | | | |
|---|---|---|---|
| 1,426,050 | 8/1922 | Donnellan | 99/182 UX |
| 1,973,634 | 9/1934 | Lang | 99/182 |
| 1,987,825 | 1/1935 | Hansen | 99/182 X |
| 2,011,631 | 8/1935 | Hansen | 99/182 |
| 2,029,303 | 2/1936 | Ball | 99/182 |
| 2,296,828 | 9/1942 | Ball | 99/214 X |
| 2,817,593 | 12/1957 | Peebles | 99/214 |
| 3,026,791 | 3/1962 | Wegener | 99/356 X |
| 3,112,205 | 11/1963 | Pech | 99/214 |
| 3,232,770 | 2/1966 | Schack et al. | 99/211 X |
| 3,035,886 | 5/1962 | Hickey | 21/57 |

FOREIGN PATENTS OR APPLICATIONS

| | | | |
|---|---|---|---|
| 942,715 | 11/1963 | Great Britain | 99/182 |

*Primary Examiner*—Norman Yudkoff
*Assistant Examiner*—F. E. Drummond
*Attorney*—Cushman, Darby & Cushman

[57] ABSTRACT

A method for sterilizing a food product contained in loosely sealed receptacles comprising placing the receptacles in an autoclave, drawing a vacuum, introducing steam to effect sterilization, reducing the pressure by drawing off or condensing the steam so as to evaporate some of the water contained in the receptacles and to thereby cause cooling of the receptacles and the food product, introducing a sterile inert gas to balance atmospheric pressure and sealing the receptacles before bringing them into contact with outside air. An apparatus for carrying out the method includes two concentric cylindrical shells defining between them an annular space. A spiral rail is secured to the inner surface of the outer cylinder and guides are secured to the outer surface of the inner cylinder so that rotation of the latter about its axis causes the receptacles to move along the rail. Appropriate valved inlets and outlets are associated with the annular space.

4 Claims, 1 Drawing Figure

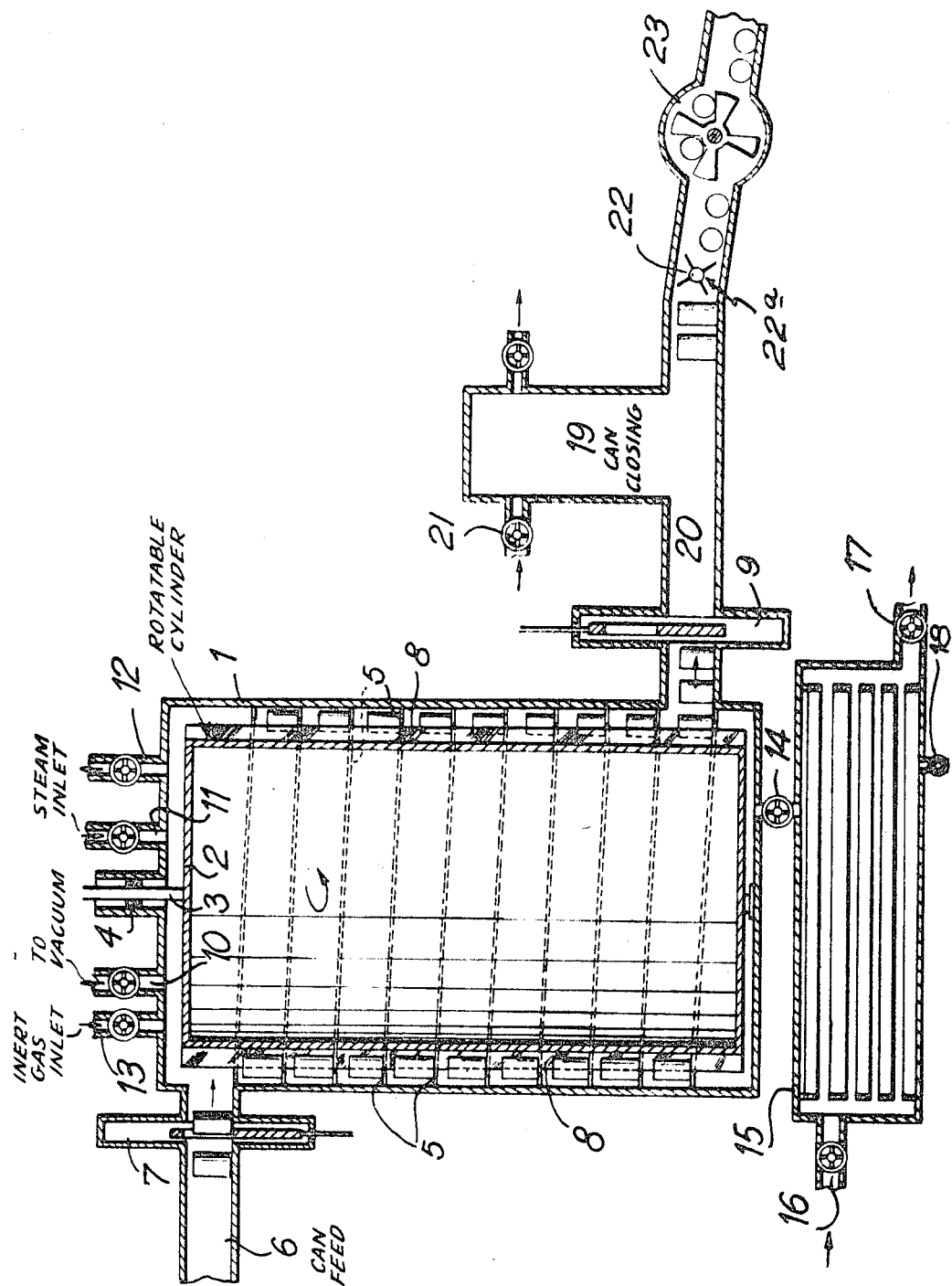

APPARATUS FOR THE STERILIZATION OF FOOD PRODUCTS

The sterilization of canned foods is generally effected after closure of the containers by the delivery of heat which is slowly propagated through the walls and then to the interior of the products by conduction and convection. Moreover, it is known that air, even in very small quantities, plays a destructive role in products preserved by sterilization, since the cells of vegetable or animal tissues enclose it and it is difficult to drive it out by usual means, such as preheating, vacuum closure, or closure in a steam jet.

Air may, however, be almost totally eliminated by placing the filled receptacles, which may be lidded but not sealed, in an enclosure where there is a high vacuum, the air in the receptacle being thereby eliminated as well as the air in the cells if the vacuum is maintained for a time sufficient to allow the air enclosed in the interior cells to diffuse to the surface.

Heating of the product is much more rapid and uniform if the heat is brought directly to the interior of the receptacle by steam because the cover is not sealed onto the receptacle and gas and steam can pass in both directions and pockets or cushions of air do not impede the steam.

After sterilization according to the standard processes, the receptacles are cooled by various means which generally require considerable time.

But the cooling is much more rapid and uniform if the receptacle is not sealed; a lowering of pressure causes evaporation of a certain amount of the water that it contains, evacuation thereof from the receptacle, and consequent cooling of the contents.

The simultaneous treatment of a large number of receptacles allows almost total elimination of the air, and sterilization with high yield.

The present invention takes these basic principles into account. Broadly, the process of the present invention includes the following steps:

1. The receptacles, metallic cans, jars, containers or bags of plastic material, etc., are filled with the food products to be preserved. The products may be raw or they may have undergone preparatory treatment usual in canning, for example, blanching, boiling, seasoning, sweetening, etc. The addition of liquids to cover, juice or syrup, can be effected or it may be omitted in certain cases. The receptacles are closed with an unsealed lid, for example, covers crimped on, or cans with perforated tops, jars with lids incompletely screwed down, plastic bags incompletely welded, etc., in order to allow passage of gases and steam in both directions.

2. One of the conventional mechanical systems introduces the receptacles thus prepared into an airtight autoclave and, after closure of the autoclave, there is established therein a high vacuum (on the order of 1 mm. to 1 cm. Hg, for example) which is held for a time sufficient to allow elimination of the air contained in the autoclave, the receptacles and the products, the said time being a few minutes, generally from 5 to 10.

3. Pure steam is introduced into the autoclave at a temperature of, for example, 80° to 150° C., depending upon the nature of the products and their pH and sufficient to penetrate the receptacles so as to heat and sterilize the container and the contents. Duration of the admission of steam depends upon the nature of the products and on the form of the receptacles, and it must be sufficient to ensure complete sterilization, for example, according to the tables for destruction of *Clostridium botulinum*.

4. The steam contained in the autoclave is suctioned off or condensed so as to cause evaporation of the water contained in the receptacles and consequently to cause the cooling of the receptacles and contents. In case the product requires a certain amount of cooking which would not occur because of the brief period of sterilization, the cooling may be delayed so as to hold the product at a sufficient temperature, e.g., about 120° to 125° C. for a period of the order of 5 to 15 minutes, for example.

5. A sterile inert gas (nitrogen or carbon dioxide for example) is introduced into the autoclave to establish a counterpressure in the autoclave and the receptacles balancing the atmospheric pressure and allowing use of cans with relatively thin walls, made of tin plate or aluminum or plastic bags. This operation can be omitted if it is desired to maintain a vacuum in the receptacles, to the extent that it is compatible with the strength of the receptacles.

6. The receptacles are sealed before they are again brought into contact with the outside air, in order to avoid any contamination of the contents by micro-organisms. The receptacles are conveyed automatically to a conventional closing apparatus which is located either within the autoclave itself or in an enclosure at the exit from the autoclave and communicating therewith by an airtight passage with a sliding or rotary valve, for example. Said passage and enclosure can be sterilized by steam and held at slightly reduced pressure of steam or inert gas during operation.

The utilization of three autoclaves makes it possible to effect practically continuous operation, one being in the course of filling, one being, after filling, used for the treating process described above, the third being in the course of discharge.

The advantages of the present invention are as follows:

a. The installation needed for carrying out the process is easy to assemble because most of the necessary apparatus, autoclaves with mechanized conveyance of the receptacles, sealing valves, tighteners and jar capping machines in a sterile atmosphere, bag sealing machines, etc., are already used in the canning industry.

b. Sterilization at high temperature during a brief period followed by rapid cooling makes it possible to obtain products of higher quality than those obtained by customary means.

c. The possibility of avoiding addition of covering liquid diminishes corrosion of the cans by electrolysis, the metallic taste appearing in certain canned goods and the loss of mineral salts and vitamins, particularly in the case of those that are sensitive to oxygen. When the excluded liquid is a simple brine (canned products designated "au naturel"), the nonuse involves a not inconsiderable lessening of weight, as in the case of most vegetables, mushrooms, mixed vegetables, etc.

d. The short duration of the treatment and the counterpressure of inert gas allow use of thin walled cans made of tin plate, aluminum cans, receptacles made of suitable plastic or mixed materials.

e. The durations of treatment are essentially the same, no matter what the form of the can, which is of particular interest in the case of large 5 to 10 kg. cans.

f. The lessened time of the operation cycle which is of the order of 15 minutes allows use of apparatus that takes up little floor space; for example, three autoclaves 2 meters in diameter and 6 meters high can turn out 12,000 cans/hour of 1/1 size (equivalent to the US 401×411 can).

g. The various products require a suitable process; temperature, duration, cooling, gassification, etc., can be handled in a single apparatus by simple controls that can be automated and programmed.

No other process of heat sterilization has yet combined the above advantages.

The description below illustrates by way of example a specific embodiment which may comprise an autoclave with automatic transfer for cylindrical receptacles, a connecting passage leading the receptacles to the closing station, then to the outside.

The autoclave comprises two concentric vertical cylinders 1 and 2, of sheet steel, the said cylinders being closed at their ends. The outer cylinder 1 is fixed, and the inner cylinder 2 is secured to and rotatable with a shaft 3 provided with packing 4. The cylinders 1 and 2 define between them an annular space in which the cans will undergo the sterilization process. The fixed cylinder 1 comprises on its internal wall a rail 5 rolled in a spiral, on which the receptacles arriving via passage 6 (valve 7 being open) will slide, being thrust by flat metallic elements or angle irons 8 which are fixed on the interior cylinder 2.

The autoclave comprises the following auxiliary components: vacuum pump inlet 10, steam inlet 11, steam purge 12, inert gas inlet 13, communication 14 with surface condenser 15 whose cooling is ensured by circulation of a fluid coolant entering at 16 and issuing at 17, the condensation water being discharged via valve 18.

The transfer of the cans from the autoclave to a chamber 19 wherein a conventional closing apparatus (not shown) is located, is effected via passage 20 located downstream from valve 9. Valve 21 allows injection of steam into the closing apparatus for sterilization of the said apparatus and of the transfer passage, or that of the inert gas, which latter can be admitted through another valve.

The unloading of the closed receptacles is effected via passage 22 comprising a tilting device 22a to cause them to roll horizontally and to lead them to the outside of the apparatus by means of a rotary valve 23 which prevents entrance of outside air into the passage.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. Apparatus for effecting sterilization of unsealed receptacles comprising: an autoclave formed of inner rotatable and fixed outer concentric vertical cylinders defining between them an annular space, said autoclave having an inlet passage for receptacles near the upper end of said space and an outlet passage for receptacles near the other end of said space; means including a driven shaft connected to said inner cylinder to rotate the same for distributing receptacles in said annular space and for moving receptacles through said space from said inlet to said outlet; valve means for closing said inlet and outlet; means including a conduit connecting with said space for drawing a vacuum in said space; means for introducing steam into said space and into the unsealed receptacles therein including a conduit connecting with said space for introducing steam into said space and receptacle-sealing means for sealing the receptacles after treatment with steam, said means including a sterilized chamber and passageway connecting the chamber with the autoclave into which the unsealed sterilized food-filled receptacles are moved.

2. Apparatus as in claim 1 wherein said outer cylinder is fixed, wherein the inner cylinder is rotatable about its axis and wherein said distributing and moving means includes shaft means for rotating said inner cylinder, a spiral rail extending from said inlet to said outlet and carried on the inner surface of the outer cylinder and guide means carried on the outer surface of said inner cylinder for urging receptacles along said rail upon rotation of said inner cylinder.

3. Apparatus as in claim 1 including a condenser and valve means for placing said condenser in communication with said annular space.

4. Apparatus as in claim 1 wherein the receptacle-sealing means includes a hollow, sterile enclosure and conveying means including a sterile conduit for conveying receptacles from said outlet into said enclosure.

* * * * *